July 18, 1967  W. H. PAYNE ETAL  3,331,236
APPARATUS FOR IMPACT TESTING OF PROTECTIVE HELMETS AND THE LIKE
Filed April 15, 1965  5 Sheets-Sheet 2

INVENTORS
William H. Payne
John M. Crook

BY

B. B. Olin
ATTORNEY

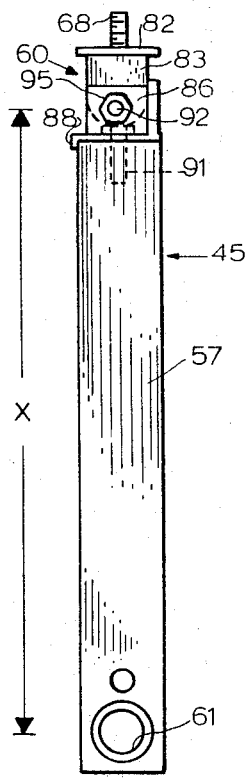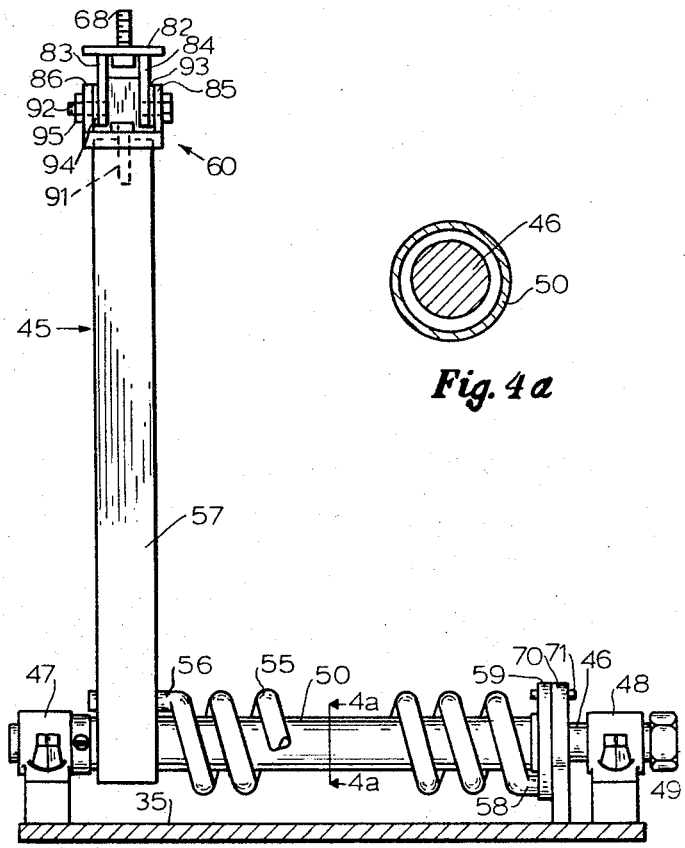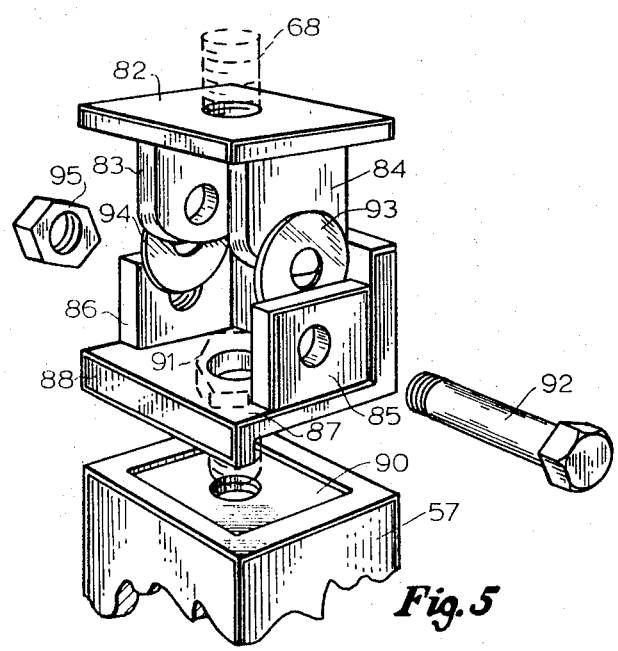

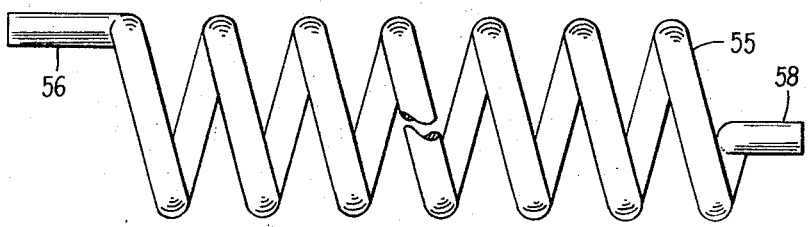
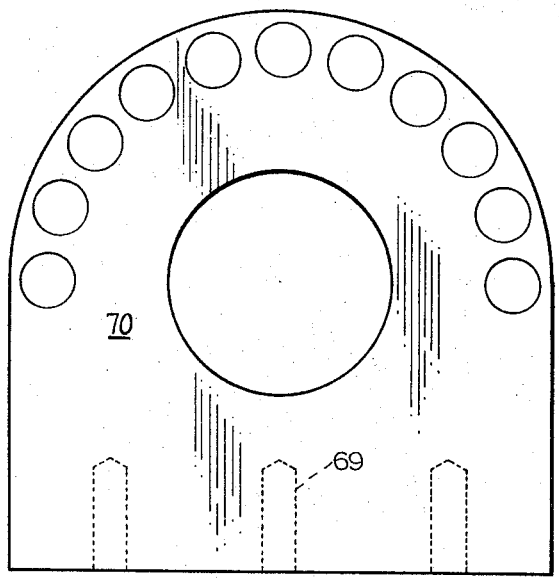
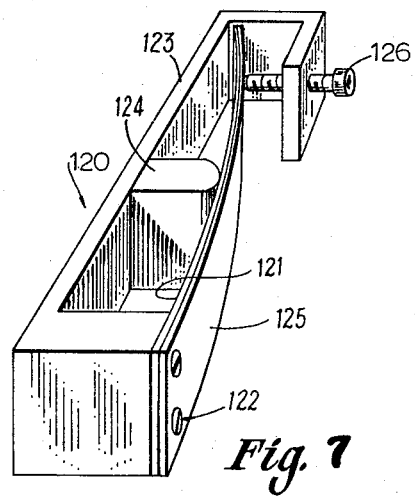
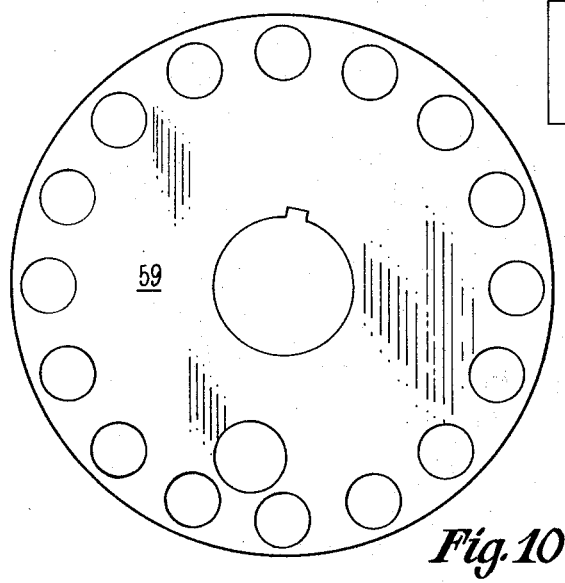
INVENTORS
William H. Payne
John M. Crook
BY
ATTORNEY INVENTORS
William H. Payne
John M. Crook
BY
ATTORNEY

United States Patent Office 3,331,236
Patented July 18, 1967

3,331,236
APPARATUS FOR IMPACT TESTING OF PROTECTIVE HELMETS AND THE LIKE
William H. Payne, Raleigh, and John M. Crook, Cary, N.C., assignors to Payne & Associates, Inc., Wake County, N.C., a corporation of North Carolina
Filed Apr. 15, 1965, Ser. No. 448,457
9 Claims. (Cl. 73—12)

ABSTRACT OF THE DISCLOSURE

An impact testing device employs a mounting arrangement suited to simulating whiplash on crash helmets and the test piece, e.g., a crash helmet, employs means for indicating and recording stress at the time of impact. Birefringement plastic and transducer stress indicators and recorders are illustrated.

---

This invention is generally concerned with impact testing of materials and with methods and apparatus employed in impact testing. More specifically, the invention relates to dynamic impact testing of protective helmets and the like and to an apparatus and method useful in such testing.

The development of modern high speed operator controlled aircraft, spacecraft and land racing and experimental vehicles has brought about an extensive investigation of causes of head injuries and of protective helmet characteristics. Typical reports are to be found in the paper, "A Comparison of Methods for the Evaluation of Protective Headgear," in the November 1964 issue of Aerospace Medicine and Technical Documentary Report No. MRL-TDR-62-19, "Helmet Impact Tests," published by Office of Technical Services, United States Department of Commerce. These reports and similar reports in the literature point up the complexity of analyzing crash helmet constructions under the influence of high-energy collisions and also point up the need for a simple and practical method and apparatus for simulating crash situations.

A review of prior art methods and apparatus for dynamic testing of helmets and the like reveals the need for test apparatus which will simulate the whiplash effect and whose acceleration can be preset to various arbitrary levels of force. It is also apparent that the rate of onset of acceleration is influential in helmet design which reflects itself in a need for test equipment in which the rate of onset of acceleration can be preset within a broad range of values. The manner in which load is distributed over the helmet and how such load is ultimately transmitted to the head are also characteristics which should reveal themselves in ideal helmet impact test equipment. Peak histories even though of short duration should preferably also be measurable.

While various techniques and forms of apparatus have been employed for dynamic impact testing of helmet structures it is apparent that the underlying approaches have been that of dropping an anvil against a fixed helmet or dropping a helmet against a fixed anvil or allowing the helmet to swing on a pendulum against a fixed anvil. Generally speaking, control over applied force and rate of onset of acceleration has been restricted to a narrow range of values. Furthermore, such prior art apparatus has not realistically simulated the head and spinal column action either in the whiplash or non-whiplash type of accident. Simulated instantaneous and final load distributions applied to the helmet and head are thus both difficult to control and to measure.

The general object of the present invention is to provide an improved apparatus and method for determining the dynamic characteristics of head protective gear and the like.

An object of the invention is also to provide an apparatus and method which lends itself to quality control of protective helmets and the like during manufacture.

A further object of the invention is to provide a helmet impact test apparatus capable of loading protective helmets and the like with impact acceleration corresponding to a preset level of force and rate of onset within a broad range of values.

Another object is to simulate in a helmet impact test apparatus the action of the spinal column and neck in various positions and degrees of stiffness.

Another object is to utilize the photoelastic technique in a method and apparatus for determining the dynamic characteristics of head protective gear and the like whereby the progression of loading may be photographically recorded.

An object is also to provide an impact testing apparatus for protective headgear and the like which is versatile in the sense of being adapted to either the photoelastic, Brinell hardness or electronic transducer load recording systems.

The foregoing and further objects of the invention will become apparent from the description and drawings which follow and in which:

FIGURE 3 is a side elevation of the articulated arm assembly by itself.

FIGURE 4 is a front elevation of the articulated arm assembly with the adjustable loading torsion spring assembly.

FIGURE 4a is a section on line 4a—4a of FIGURE 4.

FIGURE 5 is an exploded perspective view of the neck swivel portion of the articulated arm assembly.

FIGURE 7 is a perspective view of a photoelastic reference bar employed in the system of FIGURE 1.

FIGURE 9 is a side elevation of a fixed drilled plate employed to adjust the torsion spring.

FIGURE 10 is a side elevation of an adjustable drilled plate employed to adjust the torsion spring.

FIGURE 11 is a side elevation of the torsion spring employed with the articulated arm.

Figure 1:
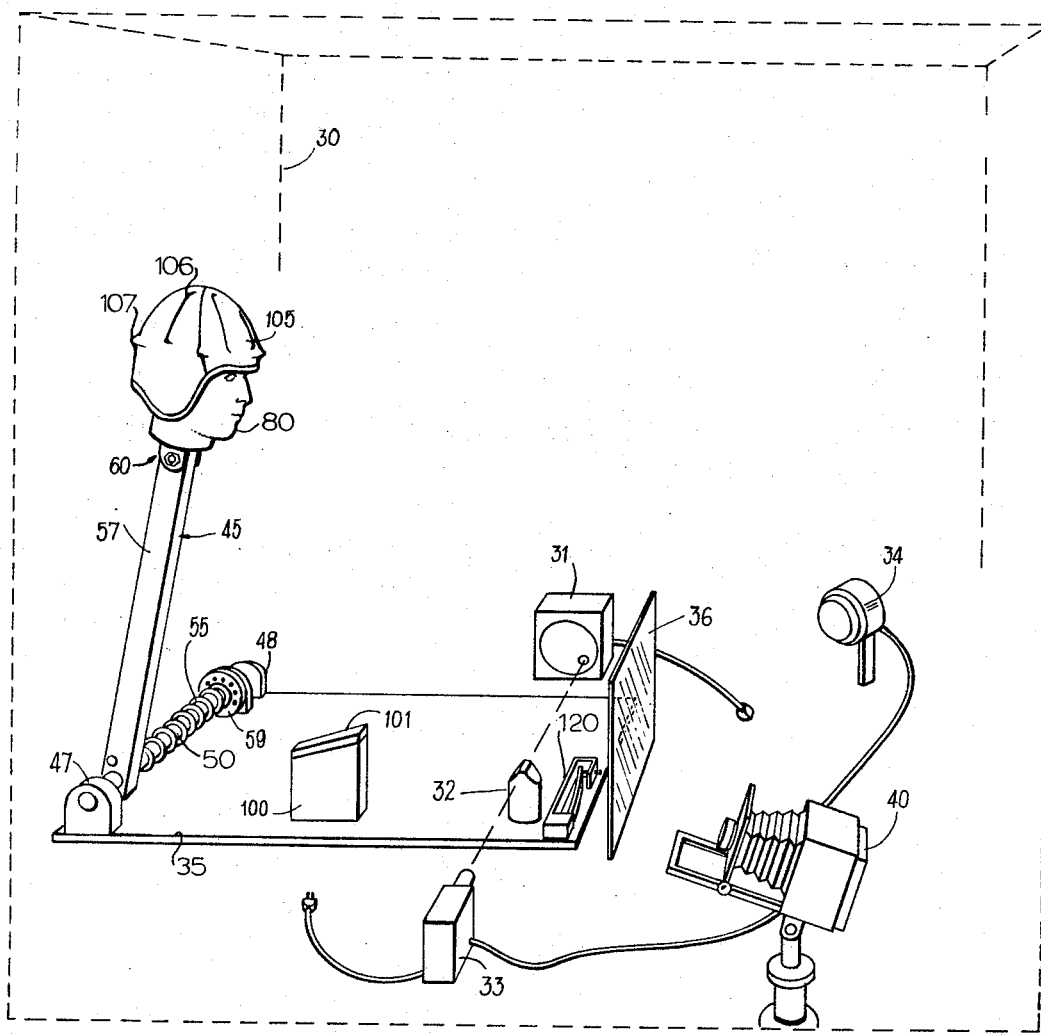
FIGURE 1 is a combined perspective and schematic view of an impact testing system following the invention to simulate spinal column and neck action and using photoelastic and photography techniques.

Referring first to FIGURE 1 there is illustrated a helmet impact test system for recording photographically the instantaneous distribution of forces over those surfaces of the helmet visible to a camera lens. In particular, the apparatus of the system is assembled in a dark room represented by the dotted lines 30 and includes a light source 31 directed across an impact anvil 32 to a photocell pickup unit 33 which controls a photoflash light unit 34. Light source 31 should preferably produce a highly collimated light beam and in practice an automobile spotlight bulb utilizing twelve volts direct current has been found satisfactory for the purpose particularly since the direct current avoids the problem of flicker. While not shown, light source 31 also includes an efficient red filter to make the light beam substantially invisible to the camera 40. The photocell pickup unit may be of conventional design and includes contacts which are normally open in the presence of the light beam produced by light source 31 and which are closed when the beam is broken as later explained.

Impact anvil or "hammer" 32 comprises a hardened steel bar member whose top surfaces are shaped and angled as indicated and which is suitably secured to a rectangular metal base plate 35. Base plate 35 also mounts at one end and in a vertical plane adjacent anvil 32 a substantially rectangular shaped circular polarized screen 36 which together with a photoelastic material on the stressed device, the helmet, enables utilization of the phenomenon of birefringence induced in such material when under stress. Base plate 35 further mounts on the end opposite screen 36 the previously referred to spring loaded articulated arm assembly generally referred to by the numeral 45. Since much of the value of the invention resides in the simplicity, versatility and utility of the arm assembly 45 the description next refers to the details of this assembly.

Arm assembly 45 includes a shaft 46 which is rotatably supported in a pair of end bearing members 47, 48 and which includes an integral head 49. Shaft 46 is surrounded by a tubular member 50 and by a torsion spring 55 one bent end portion 56 of which extends through a rigid metal square tube or arm column 57 and another bent end portion 58 of which extends through a vernier ring member 59. Column 57 is integrally secured to tubular member 50 and with tubular member 50 rotates around shaft 46.

Figure 2:
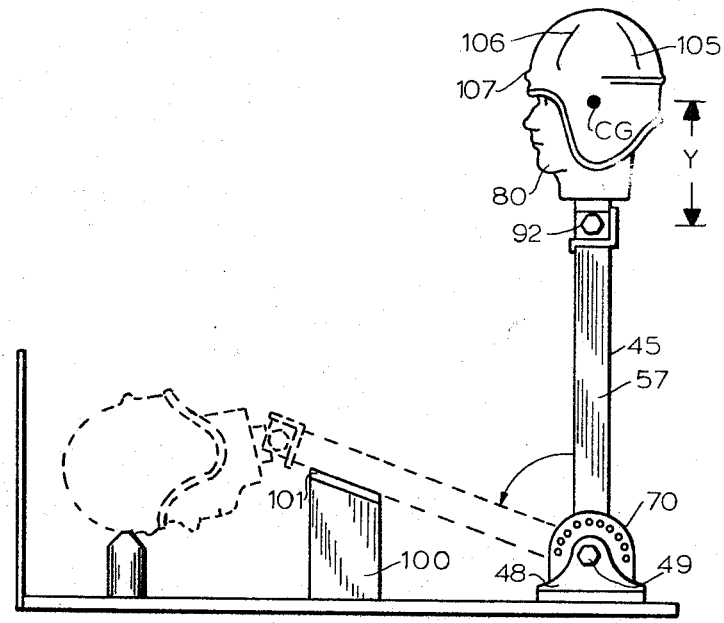
FIGURE 2 is a side elevation of the spring loaded articulated arm arrangement with a mounted anthropromorphic head as shown in FIGURE 1 and in dotted lines the position at time of impact.
Figure 8:
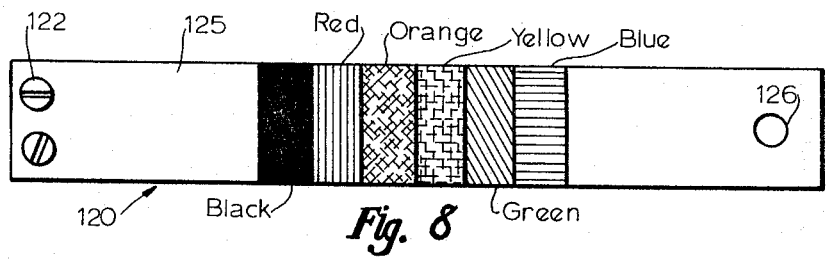
FIGURE 8 is a front elevation view of the photoelastic reference bar of FIGURE 7.

The distance X of column 57 has a length of 24 inches which represents a 95 percent percentile mean length of the human spinal column for United States Air Force males. The referred to distance X as best seen in FIGURE 3 which shows column 57 and its associated neck swivel assembly generally represented by the numeral 60, is measured from the center of a bearing 61 to the center of the axis about which the neck swivel assembly 60 swings. The distance Y of FIGURE 2 represents a 95 percent percentile means length of the human neck for United States Air Force males. The distance Y is measured from the center of bolt 92 to the center of gravity of the specimen head 80. That is, the center of gravity is spaced opposite the platform 82 or free end of neck swivel assembly 60 to simulate the average neck length. The purpose of spring 55 is of course to give a torsion load to column 57 and by regulating the tension in spring 55 to give a torsion load which can be easily changed. Spring 55 can be employed as either a positive or negative acting spring and can also be untensioned and employed with column 57 moving in a free fall effect and in this case serve as a means to provide a retardation force of some predetermined amount. While the nature of spring 55 will vary with the application of the invention a spring having a linear torsion characteristic and suitable to the purpose of helmet testing was made by winding a ⅜ inch round wire, SAE 2340 normalized and oil quenched at one turn per inch for a length of eleven inches.

The tension in spring 55 is controlled by the rotatable vernier ring member 59 which is keyed to shaft 46 and which can be locked with a constantly fixed adjusting ring 70 that is secured to plate 35 by means of bolts, not shown, that pass through plate 35 and into the holes 69 provided in ring 70. Ring members 59 and 70 are provided with a different number of holes as indicated in FIGURES 9 and 10 and are arranged such that by means of a locking pin 71, FIGURE 4, spring 55 can be adjusted in increments of one degree of arc of rotation. The actual adjustment is best effected by mounting a suitable wrench on the shaft head 49 and taking up the load on the wrench until pin 71 can be removed from whichever holes it is located in at the time. After removing pin 71, the wrench is then turned in the appropriate direction to increase or decrease the spring tension as desired.

Figure 6:
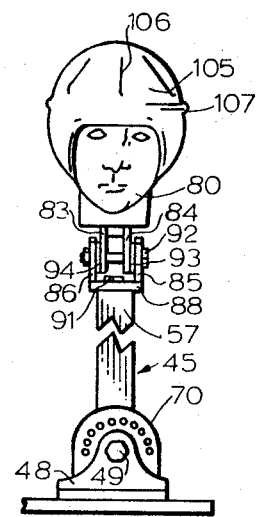
FIGURE 6 is a side elevation of the articulated arm with the test head and helmet rotated by means of the neck swivel so as to impact the side of the helmet.

In addition to the long "spinal column" section and the short "neck column" section, the arm assembly 45 also includes the neck swivel assembly 60 whose purpose is to allow the anthropromorphic dummy head 80 or other test device to rotate around the end of column 57 in typical whiplash type action. The neck swivel assembly 60 also allows the head 80 to be mounted so that the front of the head will receive the impact as in FIGURES 1 and 2, the back of the head, not shown, or the side of the head as in FIGURE 6.

Anthropromorphic heads suitable to the invention are commercially available from various sources. For example, there is available from Alderson Research Laboratories, Inc., of 48—14 33rd St., Long Island City, N.Y. a 95 percent percentile head based on United States Air Force head measurements. As best illustrated by the exploded view of the neck swivel assembly in FIGURE 5, the head is secured to the neck swivel assembly 60 by means of a bolt 68 which passes through a head connecting plate 82 having a pair of appended lugs 83, 84 which mate with a corresponding pair of lugs 85, 86 extending upward from a support plate 87 having a lip 88 adapted to engage the side of column 57. While not shown, it should be understood that the head 80 is provided with a threaded receptacle adapted to receive the head securing bolt 68. A threaded securing plate 90, FIGURE 5, is mounted by welding or the like in the top of column 57 to receive a bolt member 91, FIGURE 6, which holds the support plate 87 secured to column 57. A further bolt assembly which includes a bolt 92, a pair of friction washers 93, 94 and a nut 95 passes through the various holes shown in lugs 83, 84 and 85, 86 to complete the assembly of the neck swivel.

In use the head 80 or other device is secured to the support plate 82 and plate 87 is rotated around column 57 to whatever head impact position is desired, that is front, rear, or side, and bolt 91 is tightened in such position which brings lip 88 in engagement with column 57 to prevent further rotation. The angle of the head position and the "stiffness" of the head action is controlled by the position of the head connecting plate 82 and how tight nut 95 is tightened on bolt 92 which in turn governs the pressure on the friction washers 93, 94.

Whether under a free fall effect or a preloaded effect column 57 is stopped in its downward movement by means of a "chest stop" 100. Chest stops 100 comprises a metal block secured to base plate 35 by bolts or the like and having a flat top surface which slopes downward toward column 57 and on which is preferably mounted a resilient hard rubber block 101 whose purpose is to protect column 57 from undue wear and also to relieve the force of the shock when column 57 is suddenly stopped in motion.

While adapted to articles and devices other than helmets the invention is illustrated in connection with a helmet 105 which may for example be the United States Navy H–4 type helmet. This type helmet is characterized by a webstrap suspension system and a shell constructed of fiberglass mat reinforced resin which includes a system of radial ribs 106 and a circumferential rib 107. In this type helmet a thin layer of soft foam rubber 110 is conventionally provided next to the inner surface of the shell 105 beneath the suspension system. Sample helmets of this or other constructions may be tested with the apparatus of the invention without modification where the helmets for example are to be tested for structural integrity or load transmission characteristics only. Where a more complete evaluation is desired the helmet or other test device is specially prepared according to the invention with an outer coat of a properly selected photoelastic plastic. That is, where load dispersion over the helmet, elastic wave propagation, concentrated stresses, effects of holes and the like constitute the desired information the helmet is coated with a selected photoelastic plastic to enable the taking of photographs and the measurement of stress in terms of the photoelastic effect.

With regard to the matter of photoelastic plastic selection and application to the helmet, plastics generally suited to the invention are available in sheet and liquid form. Pre-cast and cured sheets are suitable for bonding to flat surfaces and liquid plastics are used for brushing clinically on the surface to be tested or for making contoured sheets for curved surfaces. The selection of a proper plastic is governed by the shape, surface, rigidity of the test specimen and by the estimated maximum strain developed in the proposed test. Liquid plastic should be brushed on the test specimen for analysis of small samples, fillets, or areas having very small radii. Contoured sheets should be used for all curved surfaces other than those referred to and should be secured with an adhesive having a matching expansion characteristic. The contoured sheet is suitable for the vast majority of helmet testing. In one application to the type helmet shown in the drawings there has been used, for example, a type PS-2 plastic and a type PL-1 adhesive as made by Photolastic, Inc., 176 Lincoln Highway, Malvern, Pa.

The rigidity of the test helmet will determine the thickness required for the plastic. The thicker the plastic, the greater the overall sensitivity of the measurements, however, a plastic which is too thick on a thin test surface such as a helmet shell may give errors in the measurements, especially under bending.

Figure 12:
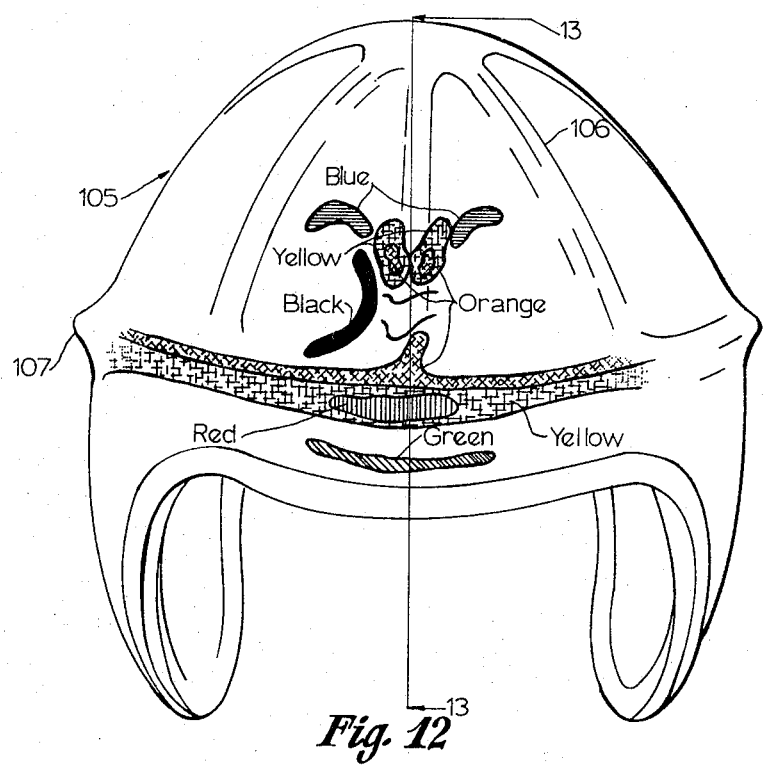
FIGURE 12 is a front view of a typical test helmet with an array of photoelastic color patterns as produced when under impact at some instant of time.
Figure 13:
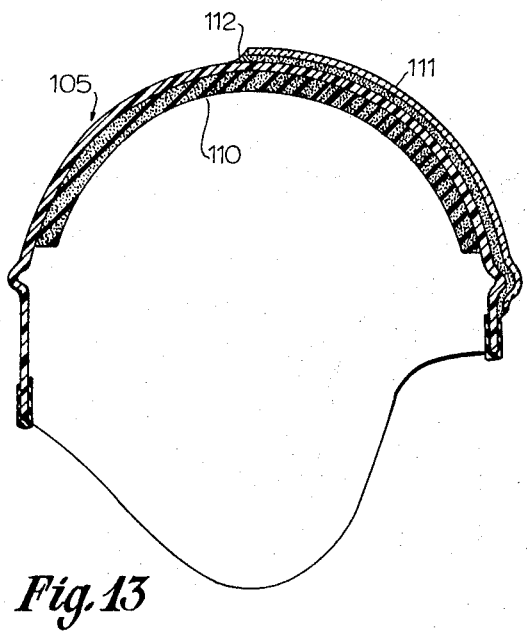
FIGURE 13 is a section taken along line 13—13 in FIGURE 12.

When the coated helmet is subjected to an impact load the surface strains are transmitted to the plastic coating and color patterns caused by the birefringence of the plastic are formed. As the birefringence of the plastic at a particular point is a function of the strain at that point, the color patterns reveal the magnitude and geography of the mechanical strains in the structure. As illustrated by FIGURE 13, there is provided over the impacted and strained surface of helmet 105 a suitable photoelastic plastic 111 which is bonded to the helmet 105 by means of a suitable bonding agent 112 and which when photographed in color through polarized screen 36 at some predetermined time of impact produces color patterns which can be seen visually and plotted as in FIGURE 12 as isochromatic stress lines.

The plastic, when stressed, exhibits artificial or temporary birefringence which can be measured and which according to known mathematical and physical relations enables the derivation of the principle stress difference in the surface of the helmet. In order to calibrate the plastic which is used on the helmet there is employed a calibration bar structure 120. Structure 120 in one embodiment comprises a cantilevered, relatively thin, flexible aluminum bar 121 which is secured by screws 122 to a heavier, relatively rigid, bent bar member 123. A pivot for bar 121, enabling it to be strained within its elastic limit, is provided by a pedestal member 124 which is secured to and made integral with bar member 123 at a position intermediate the length of bar 121. The face of bar 121 is coated with a layer of plastic 125 identical with that used on the surface of the helmet 105. Plastic 125 is stressed by means of an adjustable holding screw 126 which is mounted in the rigid bar member 123 adjacent the free end of the flexible bar 121 and which engages the plastic covered surface of bar 121.

The plastic thickness and type are preferably chosen such that under maximum stress of helmet 105 there is produced a fringe order of one. That is, as is well known in the birefringent art the colors will repeat in so-called "orders" for different elevations of load. A fringe order of one insures maximum accuracy of stress measurement under the dynamic loading conditions used in the test method. Thus, flexible bar 121 is loaded to the point that one fringe order is obtained when viewed through the circular polarized screen 36. As the load on bar 121 increases from an initial load of zero the colors at a given point in the plastic 125 covering bar 121 will change gradually from black to gray, white, yellow, brown, red, then back to yellow. The transition from red to yellow is sharply marked and is referred to as the "tint of passage" and is used as a reference for all measurements. As a maximum fringe order of one is used, the fractional order fringes are easily measured with the use of a "LF/Z" meter as made by Budd Instrument Company, of Phoenixville, Pa.

As best illustrated in FIGURE 1, the calibration bar structure 120 is placed behind the polarized screen 36 and within the field of camera 40 in order that the colors developed upon the surface of helmet 105 may be compared with the colors developed upon the surface of the plastic 125 on the surface of bar 121. Any change in color in the photographs caused by filters, screens and the like has been found to be of little consequence since colors on the surface of the plastics on helmet 105 and bar 121 are changed a like amount. Thus, colors at equal stress levels are identical in the color photographs produced by camera 40.

During a typical test the arm assembly 45 is rotated against the torsional force asserted by spring 55 until the arm 57 and anthropromorphic head 80 assume vertical positions at which time arm assembly 45 is released. Arm assembly 45 will of course be propelled forwardly by the force of spring 55 until arm 57 strikes the chest stop 100. The neck swivel assembly 60 which is originally in a vertical position at the start of the test will now allow the head 80 to increase its angular acceleration and rotate around the axis provided by bolt 92. Head 80 will continue to rotate and will impact or strike the impact anvil 32 so as to stress the helmet 105 in a typical whiplash type action. In this regard it should be noted that the described test procedure furnishes a simple "go, no-go" type production test for helmets and the like irrespective of use of the photoelastic technique to which the invention is especially adapted. That is, the final velocity, weight of head and helmet may be readily determined by known means and used to determine mathematically the input energy which energy can be repeated on a production line test basis simply by restoring the neck swivel assembly 60, head 80 and arm assembly 45 back to some predetermined vertical position preparatory to testing a subsequent helmet or the like.

Assuming that the photoelastic technique is to be employed it will be appreciated that prior to release of arm assembly 45 from its vertical test position several preliminary steps will have to be taken. Camera 40 will be loaded with appropriate color film, room 30 will be darkened, the shutter of camera 40 will be opened, light source 31 will be made operative so as to produce a beam of light aimed at the photocell relay unit 33 and photoflash light unit 34 will be prepared to fire upon the closing of the normally open contacts of relay unit 33. Further, test bar 120 will have been placed behind screen 36. With this preparatory work accomplished as helmet 105 moves through the light beam established by light source 31, it will cause the contacts in photocell relay unit 33 to close and fire photoflash unit 34. The exposure is preferably accomplished at the instant of impact at maximum deflection of the test specimen with the actual triggering and completion of the electrical triggering circuit being caused as previously stated by the movement of helmet 105 through the light beam produced by light source 31 and at the time of maximum deflection.

The light from the photoflash unit 34 passes through the circular polarized screen 36, strikes the photoelastic coating 111 bonded to the helmet 105, strikes the photoelastic coating 125 bonded to the flexible test bar 121, passes through both of the respective coatings and is reflected at the interface of the plastic and the reflecting cement employed to bond the respective plastic, is refracted back through each respective plastic, back through the polarized screen 36 and through the lens of camera 40. The processed photograph may then be employed to plot the isochromatic lines previously mentioned and illustrated by FIGURE 12. The stress associated with a particular color is determined by analyzing the pre-stressed area with an LF/Z meter as previously discussed.

While still shot photographic techniques are productive of much of the information desired, it should be noted that a series of frames may be taken with a movie camera. For example, a movie camera, not shown, may be triggered to start taking pictures at the instant of impact and continue for some predetermined time while the impact is being absorbed and dissipated over the helmet structure.

Figure 14:
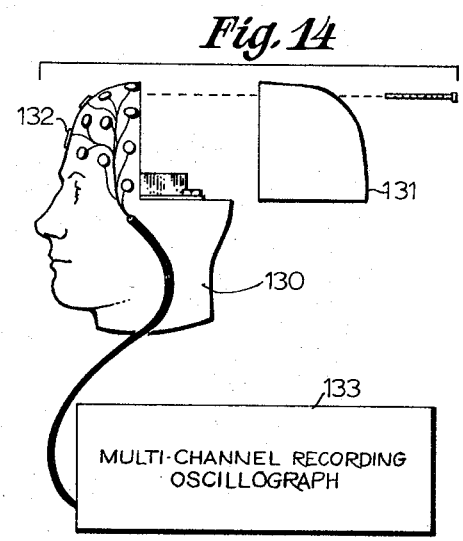
FIGURE 14 is a side elevation and schematic view of an alternate anthropromorphic head form illustrating use of electronic transducers to record impact distribution.

In order to determine the magnitude and distribution of normal forces transmitted through the helmet suspension system to the head 80 it is desirable to employ the transducer arrangement somewhat schematically illustrated by FIGURE 14. In this figure an alternate anthropomorphic head is designated by the numeral 130 and includes a removable back cover section 131. A plurality of electronic force transducers 132 are blanketed over the front surface of the head and are connected with a suitable multichannel recording oscillograph 133 such that when arm assembly 45 is released as previously described, the distribution and magnitude of normal incidence impact loads at explicit points on the head surface may be recorded.

While not illustrated by the drawings, the test equipment described may also employ a peak recording accelerometer mounted in the heads 80 or 130 which may be used both to give peak acceleration and to confirm calibration of the equipment by other means. Another known method of load distribution and magnitude which while not illustrated but which also adapts itself to the invention is the method of providing a lead sheet or other malleable sheet material over the impacted surface and located steel balls or the like over specific impacted points such that the same can be used as a means to make measurable depressions in the sheet material as an indication of loading. From the viewpoint of versatility of the invention, it might also be noted that a change in preload or retardation of the system requires simply the removal of the locking pin 71 and the rotation of the vernier ring 59 in the desired direction to either increase or decrease tension in spring 55 as required for the particular test. Since spring 55 and ring 59 can be adjusted over a relatively wide range the rate of onset and magnitude of acceleration can be selected at will and adjusted over a broad range of values. In addition to adjusting spring 55, it has also been mentioned and is again noted that the "neck joint" is also adjustable by controlling the amount of friction exerted on friction washers 93, 94 by the degree of tightness of bolt 92.

While primarily designed for helmet impact testing other uses should be noted. For example, the neck swivel assembly may be eliminated and specimens other than helmets may be secured to column 57. While "whiplash" would not be present in such an arrangement many of the advantages of the incremental spring loading could be utilized. Furthermore, such an arrangement would be superior to the conventional pendulum-anvil impact test equipment.

In summary, the invention provides an accurate, efficient and economical means for evaluating and maintaining production quality control of pilots protective helmets and the like. While a specific embodiment has been described it will be apparent to those skilled in the art that various modifications may be made without departing from the spirit of the invention as hereafter set forth in the claims.

What is claimed is:

1. In a helmet impact testing device including a helmet specimen mounting arm comprising a long section substantially equivalent in length to a predetermined average spinal column and a short section pivotedly and frictionably adjustably joined to and carried by said long section and being rotatable around the axis of said long section, a supporting platform, means secured to said platform and pivotedly mounting said specimen arm for rotational movement in a vertical plane between a substantially vertical starting position and an impact position, an anthropromorphic head adjustably secured to the free end of said short section and having its center of gravity positioned opposite and spaced from said free end to simulate a predetermined average length neck, the "stiffness" of said neck being adjustable by the adjustable frictional joining of said short and long sections, a specimen helmet mounted on said head, a stopping block secured to said platform and positioned to engage said long section intermediate its ends upon reaching said impact position to simulate whiplash action in said short section, an impact anvil secured to said platform and positioned to engage and stress a predetermined impact area on said specimen helmet while under the influence of said whiplash action, spring means fixedly secured at one end to said supporting platform and at the other end to said long section, said spring means being arranged to propel said helmet specimen mounting arm towards said stopping block when released from said starting position and stress sensitive means secured to said impacted area and productive of measurable data related to said stress and means for recording said data.

2. In a helmet impact testing device as claimed in claim 1 including for purpose of said stress sensitive and recording means birefringement plastic material secured to the impacted area of said helmet, polarized screen means for viewing said material while stressed and color photographic means for recording the appearance of said material under stress.

3. In a helmet impact testing device as claimed in claim 2 including a dark room enclosing said device and wherein said color photographic means includes light means triggered by the striking of said helmet against said anvil.

4. In a helmet testing device as claimed in claim 1 including for purpose of said stress sensitive and recording means electrical transducer means secured to the impacted area of said head and electrical means for recording the stress induced therein.

5. In an impact testing device including an elongated specimen mounting arm, a supporting platform, a pair of laterally spaced bearing members secured to said platform, a horizontal shaft pivotedly mounting one end of said arm adjacent one of said bearing members for movement in a vertical plane, said shaft extending between and rotatably mounted within said bearing members, annular ring means secured to said shaft adjacent the other of said bearing members, coil spring means mounted around said shaft and having one end secured to said arm and an opposite end secured to said ring means, means for locking said ring means and shaft to said platform in any of a plurality of incremental rotative positions whereby to control the tension in said spring means and thereby the force applied to said arm at some predetermined starting position, a specimen secured to the free end of said arm, a stopping block secured to said platform and positioned to engage said arm intermediate its length upon reaching a predetermined impact position following release from said starting position, an impact anvil secured to said platform and positioned to engage and stress a predetermined impact area on said specimen after reaching said impact position and stress sensitive means secured to said impacted area and productive of measurable data related to said stress and means for recording said data.

6. In an impact testing device as claimed in claim 5 wherein said specimen comprises a test helmet having said stress sensitive means secured to the said impact area thereof, said mounting arm approximates in length a predetermined average spinal column length and including a short arm pivotedly secured to said mounting arm, an anthropomorphic head mounting said helmet and secured to said short arm and having its center of gravity spaced opposite said short arm to simulate a predetermined average neck length whereby to simulate a whiplash type impact of said helmet.

7. In an impact testing device as claimed in claim 6 including for purpose of said stress sensitive and recording means birefringement plastic material secured to the impacted area of said helmet, polarized screen means for viewing said material while stressed and color photographic means for recording the appearance of said material under stress.

8. In an impact testing device as claimed in claim 8 including a dark room enclosing said device and wherein said color photographic means includes light means triggered by the striking of said helmet against said anvil.

9. In an impact testing device as claimed in claim 5 including for purpose of said stress sensitive and recording means electrical transducer means secured to said specimen and electrical means for recording the stress induced therein.

References Cited
UNITED STATES PATENTS
2,398,458  4/1948  Zavarella et al. _____ 73—12

FOREIGN PATENTS
15,164  6/1911  England.

JAMES J. GILL, *Acting Primary Examiner.*

RICHARD C. QUEISSER, *Examiner.*

J. D. SCHNEIDER, *Assistant Examiner.*